United States Patent
Zhao

(10) Patent No.: US 12,238,794 B2
(45) Date of Patent: Feb. 25, 2025

(54) INFORMATION PROCESSING METHOD, APPARATUS, DEVICE AND COMPUTER READABLE STORAGE MEDIUM

(71) Applicant: DATANG MOBILE COMMUNICATIONS EQUIPMENT CO., LTD., Beijing (CN)

(72) Inventor: Yali Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 655 days.

(21) Appl. No.: 17/440,623

(22) PCT Filed: Mar. 9, 2020

(86) PCT No.: PCT/CN2020/078450
§ 371 (c)(1),
(2) Date: Sep. 17, 2021

(87) PCT Pub. No.: WO2020/187079
PCT Pub. Date: Sep. 24, 2020

(65) Prior Publication Data
US 2022/0167443 A1 May 26, 2022

(30) Foreign Application Priority Data
Mar. 20, 2019 (CN) .......................... 201910212838.X

(51) Int. Cl.
*H04W 76/15* (2018.01)
*H04W 4/70* (2018.01)
(Continued)

(52) U.S. Cl.
CPC ............. *H04W 76/15* (2018.02); *H04W 4/70* (2018.02); *H04W 28/086* (2023.05); *H04W 76/14* (2018.02)

(58) Field of Classification Search
CPC ....... H04W 76/15; H04W 4/70; H04W 76/14; H04W 28/086
(Continued)

(56) References Cited

U.S. PATENT DOCUMENTS

2010/0260096 A1   10/2010   Ulupinar et al.
2015/0215826 A1   7/2015   Yamada
(Continued)

FOREIGN PATENT DOCUMENTS

CN   103582054 A   2/2014
CN   103687062 A   3/2014
(Continued)

OTHER PUBLICATIONS

"CR on PDCP structure for split bearer and LWA bearer", R2-1901800, 3GPP TSG-RAN2 Meeting RAN2#105, Athens, Greece, Feb. 25-Mar. 1, 2019, all pages.
(Continued)

*Primary Examiner* — Faisal Choudhury
(74) *Attorney, Agent, or Firm* — Ladas & Parry, LLP

(57) ABSTRACT

An information processing method, apparatus, device and a computer readable storage medium are provided. The method includes: determining, for a sidelink interface, whether to enable a bearer-splitting transmission mode for a radio bearer; obtaining an association relationship between a PDCP entity corresponding to the radio bearer and RLC
(Continued)

Determining, for a sidelink interface, whether to enable a bearer-splitting transmission mode for a radio bearer — 101

Obtaining an association relationship between a PDCP entity corresponding to the radio bearer and RLC entities corresponding to the radio bearer in a case of determining to enable the bearer-splitting transmission mode for the radio bearer — 102 entities corresponding to the radio bearer in a case of determining to enable the bearer-splitting transmission mode for the radio bearer.

15 Claims, 6 Drawing Sheets

(51) Int. Cl.
*H04W 28/086* (2023.01)
*H04W 76/14* (2018.01)

(58) Field of Classification Search
USPC .......................................................... 370/329
See application file for complete search history.

(56) References Cited

U.S. PATENT DOCUMENTS

| | | | |
|---|---|---|---|
| 2020/0068652 A1 | 2/2020 | Xu et al. | |
| 2020/0187297 A1* | 6/2020 | Jiang | H04W 80/04 |
| 2020/0236596 A1* | 7/2020 | Liu | H04W 28/0933 |

FOREIGN PATENT DOCUMENTS

| | | | | |
|---|---|---|---|---|
| CN | 105917716 A | 8/2016 | | |
| EP | 3609106 A1 | 2/2020 | | |
| RU | 2742204 C1 * | 2/2021 | ........... | H04L 1/1635 |
| WO | 2014/023254 A1 | 2/2014 | | |
| WO | 2018/057076 A1 | 3/2018 | | |
| WO | 2018202190 A1 | 11/2018 | | |

OTHER PUBLICATIONS

"Support of NR V2X in case of CU-DU split", R3-190548, 3GPP TSG RAN WG3 Meeting #103, Athens, Greece, Feb. 25-Mar. 1, 2019, all pages.
First Office Action and search report from CN app. No. 201910212838. X, dated Apr. 2, 2021, with English translation provided by Global Dossier, all pages.
International Search Report from PCT/CN2020/078450, dated May 27, 2020, with English translation from WIPO, all pages.
Written Opinion of the International Searching Authority from PCT/CN2020/078450, dated May 27, 2020, with English translation from WIPO, all pages.
International Preliminary Report on Patentability from PCT/CN2020/078450, dated Sep. 16, 2021, with English translation from WIPO, all pages.
3rd Generation Partnership Project; Technical Specification Group Services and System Aspects; Release 15 Description; Summary of Rel-15 Work Items (Release 15), Technical Report TR 21.915 V0.7.0, Feb. 2019, all pages.
Extended European Search Report for European Patent Application 20772784.3 issued on Apr. 14, 2022, all pages.
"Technical Specification Group Radio Access Network; Evolved Universal Terrestrial Radio Access (E-UTRA); Packet Data Convergence Protocol (PDCP) specification (Release 15)," 3GPP TS 36.323 v15.2.0, Dec. 2018, all pages.

* cited by examiner

INFORMATION PROCESSING METHOD, APPARATUS, DEVICE AND COMPUTER READABLE STORAGE MEDIUM

CROSS-REFERENCE TO RELATED APPLICATIONS

This application is a U.S. national phase application of a PCT Application No. PCT/CN2020/078450 filed on Mar. 9, 2020, which claims a priority to the Chinese patent application No. 201910212838.X filed in China on Mar. 20, 2019, the disclosures of which are incorporated herein in their entireties.

TECHNICAL FIELD

The present disclosure relates to the field of communication technologies, in particular, relates to an information processing method, an information processing apparatus, an information processing device and a computer readable storage medium.

BACKGROUND

Direct communication is allowed between devices in close proximity to each other. A link for direct communication between terminals is defined as a sidelink (Sidelink). Devices in direct communication may be all in an in-network state, or in an off-network state, or some may be in the in-network state and some may be in the off-network state.

In new radio (New Radio (NR)) systems, data in one logical channel may be transmitted over multiple carriers simultaneously. If a same radio access technology is used for aggregated carriers, it is more straightforward that only one medium access control (Medium Access Control (MAC)) entity is used only. Through a scheduling function in the MAC entity, the data of the logical channel is scheduled to be transmitted on different carriers, or cells, or bandwidth parts (BWP). A transmission terminal still uses the same radio link control (Radio Link Control (RLC)) entity, thus a reception terminal may receive the data correctly. However, if different radio access technologies are used for the aggregated carriers, e.g., long term evolution (LTE) sidelink and NR sidelink transmission are adopted at the same time, how to schedule the data of the logical channel to be transmitted on different carriers, or cells, or BWPs corresponding to different radio access technologies is not clearly defined in the relevant art. Therefore, when the data of the logical channel is transmitted over multiple carriers via a sidelink interface at the same time, how to make the reception terminal receive the data correctly is the technical problem that needs to be studied.

SUMMARY

Embodiments of the present disclosure provide an information processing method, an information processing apparatus, an information processing device and a computer readable storage medium, so as to ensure that the reception terminal may perform correct reception when data of a logical channel is transmitted simultaneously over multiple carriers via the sidelink interface.

In a first aspect, an embodiment of the present disclosure provides an information processing method, and the method is performed by a transmission terminal and includes: determining, for a sidelink interface, whether to enable a bearer-splitting transmission mode for a radio bearer; obtaining an association relationship between a PDCP entity corresponding to the radio bearer and RLC entities corresponding to the radio bearer in a case of determining to enable the bearer-splitting transmission mode for the radio bearer; where a quantity of RLC entities corresponding to the PDCP entity is N, N is an integer and N≥2.

Whether to enable the bearer-splitting transmission mode for the radio bearer is determined by using any of following: pre-configuration; being determined by the transmission terminal itself; that the transmission terminal determines, based on a configuration obtained from a network-side device, that the network-side device determines whether to enable the bearer-splitting transmission mode for the radio bearer.

Different RLC entities correspond to different MAC entities.

Obtaining the association relationship between the PDCP entity corresponding to the radio bearer and the RLC entities corresponding to the radio bearer includes: obtaining a predetermined association relationship among logical channel identities of multiple RLC layers corresponding to the radio bearer.

A mode of the predetermination includes any one of: predetermination in a protocol; predetermination in pre-configuration information of the transmission terminal and a reception terminal.

Obtaining the association relationship between the PDCP entity corresponding to the radio bearer and the RLC entities corresponding to the radio bearer includes: receiving a configuration signaling transmitted by a network-side device; obtaining, based on the configuration signaling, an association relationship among logical channel identities of multiple RLC layers corresponding to the radio bearer.

Obtaining the association relationship between the PDCP entity corresponding to the radio bearer and the RLC entities corresponding to the radio bearer includes: determining, by the transmission terminal itself, an association relationship among logical channel identities of multiple RLC layers corresponding to the radio bearer.

The method further includes: indicating to a reception terminal the association relationship via the sidelink interface.

Indicating to the reception terminal the association relationship via the sidelink interface includes: indicating, through a control-plane signaling over the sidelink interface, to the reception terminal the association relationship among logical channel identities of multiple RLC layers corresponding to the radio bearer.

The control-plane signaling over the sidelink interface includes any one of following: a radio resource control (RRC) signaling over the sidelink interface; a MAC signaling over the sidelink interface; a physical layer signaling over the sidelink interface.

The control-plane signaling over the sidelink interface includes at least one of following: an identity of the PDCP entity; identity information of logical channels of multiple RLC layers associated to the same PDCP entity.

Indicating to the reception terminal the association relationship via the sidelink interface includes: carrying an identity of a PDCP entity, corresponding to data to be transmitted, of the transmission terminal by using user-plane data over the sidelink interface.

The identity of the PDCP entity is carried in a header or a data portion of a PDCP protocol data unit (PDU); or the identity of the PDCP entity is carried in a header or a data portion of an RLC PDU.

In a second aspect, an embodiment of the present disclosure provides an information processing method, and the method is performed by a reception terminal and includes: obtaining an association relationship between a PDCP entity corresponding to a radio bearer and RLC entities corresponding to the radio bearer; processing a received packet according to the association relationship.

The radio bearer is a bearer for which a sidelink interface enables a bearer-splitting transmission mode; a quantity of RLC entities corresponding to the PDCP entity is N, N is an integer and N≥2.

Obtaining the association relationship between the PDCP entity corresponding to the radio bearer and the RLC entities corresponding to the radio bearer includes: obtaining a predetermined association relationship among logical channel identities of multiple RLC layers corresponding to the radio bearer.

A mode of the predetermination includes any one of: predetermination in a protocol; predetermination in pre-configuration information of the transmission terminal and a reception terminal.

Obtaining the association relationship between the PDCP entity corresponding to the radio bearer and the RLC entities corresponding to the radio bearer includes: receiving a configuration signaling transmitted by a network-side device; obtaining, based on the configuration signaling, an association relationship among logical channel identities of multiple RLC layers corresponding to the radio bearer.

Obtaining the association relationship between the PDCP entity corresponding to the radio bearer and the RLC entities corresponding to the radio bearer includes: receiving a control-plane signaling over the sidelink interface transmitted by a transmission terminal; obtaining, based on the control-plane signaling over the sidelink interface, an association relationship among logical channel identities of multiple RLC layers corresponding to the radio bearer.

The control-plane signaling over the sidelink interface includes any one of: a RRC signaling over the sidelink interface; a MAC signaling over the sidelink interface; a physical layer signaling over the sidelink interface.

The control-plane signaling over the sidelink interface includes at least one of: an identity of the PDCP entity; identity information of logical channels of multiple RLC layers associated with the same PDCP entity.

Obtaining the association relationship between the PDCP entity corresponding to the radio bearer and the RLC entities corresponding to the radio bearer includes: receiving user-plane data over the sidelink interface transmitted by a transmission terminal, where the user-plane data over the sidelink interface carries an identity of a PDCP entity, corresponding to data to be transmitted, of the transmission terminal; obtaining, based on the identity of the PDCP entity, the association relationship between the PDCP entity corresponding to the radio bearer and the RLC entities corresponding to the radio bearer.

The identity of the PDCP entity is carried in a header or a data portion of a PDCP protocol data unit (PDU); or, the identity of the PDCP entity is carried in a header or a data portion of an RLC PDU.

Processing the received packet according to the association relationship includes: determining whether there is a RLC entity corresponding to the received packet; establishing a corresponding RLC entity in a case that it is determined that there is no corresponding RLC entity; determining whether there is a PDCP entity corresponding to a target packet according to the association relationship and a logical channel identity of the received packet; establishing a corresponding PDCP entity in a case that it is determined that there is no corresponding PDCP entity; associating the RLC entity corresponding to the received packet with the PDCP entity in a case that the corresponding PDCP entity is determined to be available.

There is a bearer-splitting association relationship between a logical channel identity of the target packet and the logical channel identity of the received packet.

In a third aspect, an embodiment of the present disclosure provides an information processing method. The method is applied to a network-side device and includes: transmitting a configuration signaling to a terminal, where the configuration signaling includes an association relationship between a PDCP entity corresponding to a radio bearer and RLC entities corresponding to the radio bearer.

The radio bearer is a bearer for which a sidelink interface enables a bearer-splitting transmission mode; a quantity of RLC entities corresponding to the PDCP entity is N, N is an integer and N≥2.

Prior to transmitting the configuration signaling to the terminal, the method further includes: determining whether to enable the bearer-splitting transmission mode for the radio bearer.

The terminal includes a transmission terminal and a reception terminal.

Transmitting the configuration signaling to the terminal includes: configuring an association relationship among logical channel identities of multiple RLC layers corresponding to the radio bearer for the transmission terminal and/or the reception terminal via broadcast or dedicated signaling.

In a fourth aspect, an embodiment of the present disclosure provides an information processing apparatus, and the apparatus is applied to a transmission terminal and includes: a determination module, configured to determine, for a sidelink interface, whether to enable a bearer-splitting transmission mode for a radio bearer; an obtaining module, configured to obtain an association relationship between a PDCP entity corresponding to the radio bearer and RLC entities corresponding to the radio bearer in a case of determining to enable the bearer-splitting transmission mode for the radio bearer.

A quantity of the RLC entities corresponding to the PDCP entity is N, N is an integer and N≥2.

The determination module is specifically configured to determine whether to enable the bearer-splitting transmission mode for the radio bearer by using any of: pre-configuration; being determined by itself; that it is determined, based on a configuration obtained from a network-side device, that the network-side device determines whether to enable the bearer-splitting transmission mode for the radio bearer.

In a fifth aspect, an embodiment of the present disclosure provides an information processing apparatus, and the apparatus is applied to a reception terminal and includes: an obtaining module, configured to obtain an association relationship between a PDCP entity corresponding to a radio bearer and RLC entities corresponding to the radio bearer; a processing module, configured to process a received packet according to the association relationship.

The radio bearer is a bearer for which a sidelink interface enables a bearer-splitting transmission mode; a quantity of the RLC entities corresponding to the PDCP entity is N, N is an integer and N≥2.

The obtaining module is specifically configured to obtain a predetermined association relationship among logical channel identities of multiple RLC layers corresponding to the radio bearer.

In a sixth aspect, an embodiment of the present disclosure provides an information processing apparatus. The apparatus is applied to a network-side device and includes: a transmission module, configured to transmit a configuration signaling to a terminal, where the configuration signaling includes an association relationship between a PDCP entity corresponding to a radio bearer and RLC entities corresponding to the radio bearer;

The radio bearer is a bearer for which a sidelink interface enables a bearer-splitting transmission mode; a quantity of the RLC entities corresponding to the PDCP entity is N, N is an integer and N≥2.

The apparatus further includes: a determination module, configured to determine whether to enable the bearer-splitting transmission mode for the radio bearer.

In a seventh aspect, an embodiment of the present disclosure provides a transmission terminal including: a transceiver, a storage, a processor and a program stored in the storage and performed by the processor; the processor is configured to read the program in the storage and perform the following process: determining, for a sidelink interface, whether to enable a bearer-splitting transmission mode for a radio bearer; obtaining an association relationship between a PDCP entity corresponding to the radio bearer and RLC entities corresponding to the radio bearer in a case of determining to enable the bearer-splitting transmission mode for the radio bearer.

A quantity of the RLC entities corresponding to the PDCP entity is N, N is an integer and N≥2.

The processor is further configured to read the program in the storage and perform following step: determining to enable the bearer-splitting transmission mode for the radio bearer by using any of: pre-configuration; being determined by itself; that it is determined, based on a configuration obtained from a network-side device, that the network-side device determines whether to enable the bearer-splitting transmission mode for the radio bearer.

Different RLC entities correspond to different MAC entities.

The processor is further configured to read the program in the storage and perform following step: obtaining a predetermined association relationship among logical channel identities of multiple RLC layers corresponding to the radio bearer.

A mode of the predetermination includes any one of: predetermination in a protocol; predetermination in pre-configuration information of the transmission terminal and a reception terminal.

The processor is further configured to read the program in the storage and perform following steps: receiving a configuration signaling transmitted by a network-side device; obtaining, based on the configuration signaling, an association relationship among logical channel identities of multiple RLC layers corresponding to the radio bearer.

The processor is further configured to read the program in the storage and perform following step: determining by itself an association relationship among logical channel identities of multiple RLC layers corresponding to the radio bearer.

The processor is further configured to read the program in the storage and perform following step: indicating to a reception terminal the association relationship via the sidelink interface.

The processor is further configured to read the program in the storage and perform following step: indicating, through a control-plane signaling over the sidelink interface, to the reception terminal the association relationship among logical channel identities of multiple RLC layers corresponding to the radio bearer.

The control-plane signaling over the sidelink interface includes any one of: a RRC signaling over the sidelink interface; a MAC signaling over the sidelink interface; a physical layer signaling over the sidelink interface.

The control-plane signaling over the sidelink interface includes at least one of: an identity of the PDCP entity; identity information of logical channels of multiple RLC layers associated to the same PDCP entity.

The processor is further configured to read the program in the storage and perform following step: carrying an identity of a PDCP entity, corresponding to data to be transmitted, of the transmission terminal by using user-plane data over the sidelink interface.

The identity of the PDCP entity is carried in a header or a data portion of a PDCP PDU; or, the identity of the PDCP entity is carried in a header or a data portion of an RLC PDU.

In an eighth aspect, an embodiment of the present disclosure provides a reception terminal including: a transceiver, a storage, a processor and a program stored in the storage and executable by the processor; where, the processor is configured to read the program in the storage and perform the following process: obtaining an association relationship between a PDCP entity corresponding to a radio bearer and RLC entities corresponding to the radio bearer; processing a received packet according to the association relationship.

The radio bearer is a bearer for which a sidelink interface enables a bearer-splitting transmission mode; a quantity of the RLC entities corresponding to the PDCP entity is N, N is an integer and N≥2.

The processor is further configured to read the program in the storage and perform following step: obtaining a predetermined association relationship among logical channel identities of multiple RLC layers corresponding to the radio bearer.

A mode of the predetermination includes any one of: predetermination in a protocol; predetermination in pre-configuration information of the transmission terminal and a reception terminal.

The processor is further configured to read the program in the storage and perform following steps: receiving a configuration signaling transmitted by a network-side device; obtaining, based on the configuration signaling, an association relationship among logical channel identities of multiple RLC layers corresponding to the radio bearer.

The processor is further configured to read the program in the storage and perform following steps: receiving a control-plane signaling over the sidelink interface transmitted by a transmission terminal; obtaining, based on the control-plane signaling over the sidelink interface, an association relationship among logical channel identities of multiple RLC layers corresponding to the radio bearer.

The control-plane signaling over the sidelink interface includes any one of: a RRC signaling over the sidelink interface; a MAC signaling over the sidelink interface; a physical layer signaling over the sidelink interface.

The control-plane signaling over the sidelink interface includes at least one of: an identity of the PDCP entity; identity information of logical channels of multiple RLC layers associated to the same PDCP entity.

The processor is further configured to read the program in the storage and perform following steps: receiving user-plane data over the sidelink interface transmitted by a transmission terminal, where the user-plane data over the sidelink interface carries an identity of a PDCP entity, corresponding to data to be transmitted, of the transmission terminal; obtaining, based on the identity of the PDCP entity, the association relationship between the PDCP entity corresponding to the radio bearer and the RLC entities corresponding to the radio bearer.

The identity of the PDCP entity is carried in a header or a data portion of a PDCP PDU; or, the identity of the PDCP entity is carried in a header or a data portion of an RLC PDU.

The processor is further configured to read the program in the storage and perform following steps: determining whether there is a RLC entity corresponding to the received packet; establishing the corresponding RLC entity in a case that it is determined that there is no corresponding RLC entity; determining whether there is a PDCP entity corresponding to a target packet according to the association relationship and a logical channel identity of the received packet; establishing the corresponding PDCP entity in a case that it is determined that there is no corresponding PDCP entity; associating the RLC entity corresponding to the received packet with the PDCP entity in a case that the corresponding PDCP entity is determined to be available.

There is a bearer-splitting association relationship between a logical channel identity of the target packet and the logical channel identity of the received packet.

In a ninth aspect, an embodiment of the present disclosure provides a network-side device including a transceiver, a storage, a processor and a program stored in the storage and performed by the processor.

The transceiver is configured to transmit a configuration signaling to a terminal, where the configuration signaling includes an association relationship between a PDCP entity corresponding to a radio bearer and RLC entities corresponding to the radio bearer.

The radio bearer is a bearer for which a sidelink interface enables a bearer-splitting transmission mode; a quantity of the RLC entities corresponding to the PDCP entity is N, N is an integer and N≥2.

The processor is further configured to read the program in the storage and perform following step: determining whether to enable the bearer-splitting transmission mode for the radio bearer.

The terminal includes a transmission terminal and a reception terminal.

The transceiver is further configured to configure an association relationship among logical channel identities of multiple RLC layers corresponding to the radio bearer to the transmission terminal and/or the reception terminal via broadcast or dedicated signaling.

In a tenth aspect, an embodiment of the present disclosure provides a communication device including a transceiver, a storage, a processor and a program stored in the storage and performed by the processor.

The processor is configured to read the program in the storage to implement the steps of the method as described in any one of the first aspect; or implement the steps of the method as described in any one of the second aspect; or implement the steps of the method as described in any one of the third aspect.

In an eleventh aspect, an embodiment of the present disclosure provides a computer readable storage medium having a program stored thereon, the program is performed by a processor to implement the steps of the method as described in any one of the first aspect; or implement the steps of the method as described in any one of the second aspect; or implement the steps of the method as described in any one of the third aspect.

In the embodiment of the present disclosure, the association relationship between the PDCP entity corresponding to the radio bearer and RLC entities corresponding to the radio bearer is obtained in a case of determining to enable the bearer-splitting transmission mode for the radio bearer, so that the embodiment of the present disclosure is used to ensure that the reception terminal may perform correct reception when data of a logical channel is transmitted simultaneously over multiple carriers via the sidelink interface.

BRIEF DESCRIPTION OF THE DRAWINGS

In order to more clearly illustrate the technical solutions in embodiments of the present disclosure, the drawings used in the embodiments of the present disclosure will be briefly introduced below. Obviously, the drawings in the following description are only some embodiments of the present disclosure. Based on these drawings, other drawings may be obtained by those skilled in the art without any creative work.

DETAILED DESCRIPTION

The technical solutions of embodiments of the present disclosure will be clearly and thoroughly described below with reference to the drawings of embodiments of the present disclosure. Apparently, the described embodiments are some embodiments of the present disclosure, but are not all of the embodiments. Based on the embodiments of the present disclosure, all other embodiments derived by a person of ordinary skill in the art without any creative efforts shall fall within the scope of the present disclosure.

Figure 1:
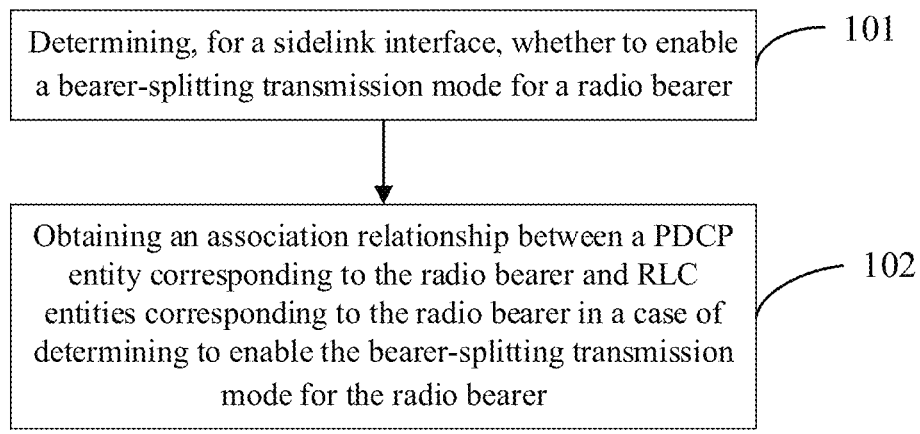
FIG. 1 is a first flowchart illustrating an information processing method provided in an embodiment of the present disclosure.

Referring to FIG. 1, FIG. 1 is a flowchart illustrating an information processing method provided in an embodiment of the present disclosure. The method is applied to a transmission terminal, as shown in FIG. 1, the method includes Step 101 and Step 102.

Step 101: determining, for a sidelink interface, whether to enable a bearer-splitting transmission mode for a radio bearer.

In the embodiment of the present disclosure, the bear-splitting refers to a case in which a bearer of the terminal is transmitted over multiple carriers, or cells or BWPs.

In the embodiment of the present disclosure, whether to enable the bearer-splitting transmission mode for the radio bearer is determined by using any of following: pre-configuration; being determined by the transmission terminal itself; determination by the transmission terminal based on a configuration obtained from a network-side device, determination by the network-side device on whether to enable the bearer-splitting transmission mode for the radio bearer.

The above different determination ways may be adopted depending on needs, thus increasing flexibility.

Step 102: obtaining an association relationship between a PDCP entity corresponding to the radio bearer and RLC entities corresponding to the radio bearer in a case of determining to enable the bearer-splitting transmission mode for the radio bearer; where a quantity of the RLC entity corresponding to the PDCP entity is N, N is an integer and N≥2.

Also, in the embodiment of the present disclosure, different RLC entities correspond to different MAC entities to ensure reliable communication.

In the embodiment of the present disclosure, the transmission terminal may obtain the corresponding relationship by using the following manners.

Manner 1: the transmission terminal obtains a predetermined association relationship among logical channel identities (LCID (Logical Channel Identity)) of multiple RLC layers corresponding to the radio bearer.

A manner for the predetermination includes any one of following: predetermination in a protocol; predetermination in pre-configuration information for the transmission terminal and the reception terminal.

Manner 2: the transmission terminal receives a configuration signaling transmitted by a network-side device; obtains, based on the configuration signaling, an association relationship among logical channel identities of multiple RLC layers corresponding to the radio bearer.

Manner 3: the transmission terminal itself determines an association relationship among logical channel identities of multiple RLC layers corresponding to the radio bearer.

In this case, the transmission terminal may also indicate, to a reception terminal, the association relationship via the sidelink interface. Specifically, the following ways (1) and (2) may be used.

(1) The transmission terminal indicates, based on a control-plane signaling over the sidelink interface, to the reception terminal the association relationship among logical channel identities of multiple RLC layers corresponding to the radio bearer.

The control-plane signaling over the sidelink interface includes any one of following: a RRC signaling over the sidelink interface; a MAC signaling over the sidelink interface; a physical layer signaling over the sidelink interface.

In practical applications, the control-plane signaling over the sidelink interface includes at least one of following: an identity of the PDCP entity; identity information of logical channels of multiple RLC layers associated with the same PDCP entity.

(2) The transmission terminal carries an identity of a PDCP entity, corresponding to data to be transmitted, of the transmission terminal by using user-plane data over the sidelink interface.

The identity of the PDCP entity is carried in a header or data portion of a PDCP PDU; or, the identity of the PDCP entity is carried in a header or data portion of an RLC PDU.

In the embodiment of the present disclosure, the association relationship between the PDCP entity corresponding to the radio bearer and RLC entities corresponding to the radio bearer is obtained in a case of determining to enable the bearer-splitting transmission mode for the radio bearer, so that the embodiment of the present disclosure is used to ensure that the reception terminal may perform correct reception when data of a logical channel is transmitted simultaneously over multiple carriers via the sidelink interface.

Figure 2:
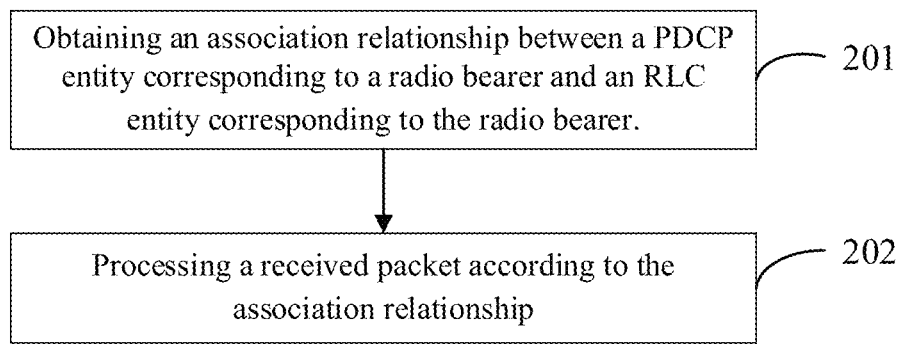
FIG. 2 is a second flowchart illustrating an information processing method provided in an embodiment of the present disclosure.

Referring to FIG. 2, FIG. 2 is a flowchart illustrating an information processing method provided in an embodiment of the present disclosure. The method is applied to a reception terminal, as shown in FIG. 2, the method includes Step 201 and Step 202.

Step 201: obtaining an association relationship between a PDCP entity corresponding to a radio bearer and RLC entities corresponding to the radio bearer.

The radio bearer is a bearer for which a sidelink interface enables a bearer-splitting transmission mode; a quantity of the RLC entities corresponding to the PDCP entity is N, N is an integer and N≥2.

In the embodiment of the present disclosure, the reception terminal may obtain the association relationship by using any one of the following manners 1-4.

Manner 1: the reception terminal obtains a predetermined association relationship among logical channel identities of multiple RLC layers corresponding to the radio bearer.

A manner for the predetermination includes any one of following: predetermination in a protocol; predetermination in pre-configuration information for the transmission terminal and a reception terminal.

Manner 2: the reception terminal receives a configuration signaling transmitted by a network-side device; obtains, based on the configuration signaling, an association relationship among logical channel identities of multiple RLC layers corresponding to the radio bearer.

Manner 3: the reception terminal receives a control-plane signaling over the sidelink interface transmitted by a transmission terminal; obtains, based on the control-plane signaling over the sidelink interface, an association relationship among logical channel identities of multiple RLC layers corresponding to the radio bearer.

The control-plane signaling over the sidelink interface includes any one of following: an RRC signaling over the sidelink interface; a MAC signaling over the sidelink interface; a physical layer signaling over the sidelink interface.

The control-plane signaling over the sidelink interface includes at least one of following: an identity of the PDCP entity; identity information of logical channels of multiple RLC layers associated with the same PDCP entity.

Manner 4: the reception terminal receives user-plane data over the sidelink interface, transmitted by a transmission terminal, where the user-plane data over the sidelink interface carries an identity of a PDCP entity, corresponding to data to be transmitted, of the transmission terminal. Then, based on the identity of the PDCP entity, the association relationship between the PDCP entity corresponding to the radio bearer and the RLC entities corresponding to the radio bearer is obtained.

The identity of the PDCP entity is carried in a header or data portion of a PDCP PDU; or, the identity of the PDCP entity is carried in a header or data portion of an RLC PDU.

Step 202: processing a received packet according to the association relationship.

Specifically, in this step, the reception terminal firstly determines whether there is a RLC entity corresponding to the received packet. The corresponding RLC entity is established in a case that it is determined that there is no corresponding RLC entity. Then, it is determined whether there is a corresponding PDCP entity for a target packet according to the association relationship and a logical channel identity of the received packet. The corresponding PDCP entity is established in a case that it is determined that there is no corresponding PDCP entity; the RLC entity corresponding to the received packet is associated with the PDCP entity in a case that the corresponding PDCP entity is determined to be available. There is a bearer-splitting association relationship between a logical channel identity of the target packet and the logical channel identity of the received packet.

In the embodiment of the present disclosure, the association relationship between the PDCP entity corresponding to the radio bearer and RLC entities corresponding to the radio bearer is obtained in a case of determining to enable the bearer-splitting transmission mode for the radio bearer, so that the embodiment of the present disclosure is used to ensure that the reception terminal may perform correct reception when data of a logical channel is transmitted simultaneously over multiple carriers via the sidelink interface.

Figure 3:
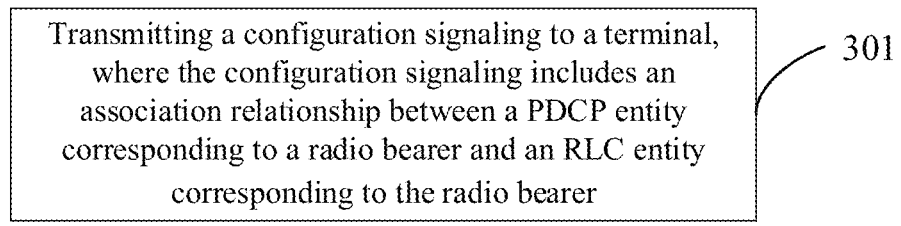
FIG. 3 is a third flowchart illustrating an information processing method provided in an embodiment of the present disclosure.

Referring to FIG. 3, FIG. 3 is a flowchart illustrating an information processing method provided in an embodiment of the present disclosure. The method is applied to a network-side device, as shown in FIG. 3, the method includes Step 301.

Step 301: transmitting a configuration signaling to a terminal, where the configuration signaling includes an association relationship between a PDCP entity corresponding to a radio bearer and RLC entities corresponding to the radio bearer.

The radio bearer is a bearer for which a sidelink interface enables a bearer-splitting transmission mode; a quantity of the RLC entities corresponding to the PDCP entity is N, N is an integer and N≥2. The association relationship may be an association relationship among logical channel identities of multiple RLC layers corresponding to the radio bearer.

In the embodiment of the present disclosure, the terminal includes a transmission terminal and a reception terminal, and the step specifically includes: configuring an association relationship among logical channel identities of multiple RLC layers corresponding to the radio bearer for the transmission terminal and/or the reception terminal via broadcast or dedicated signalings. That is, the association relationship may be configured for either or both of the transmission terminal and the reception terminal. When the association relationship is transmitted to one of them, then the terminal that received the association relationship may transmit the association relationship to the other terminal.

In the embodiment of the present disclosure, the association relationship between the PDCP entity corresponding to the radio bearer and RLC entities corresponding to the radio bearer is obtained in a case of determining to enable the bearer-splitting transmission mode for the radio bearer, so that the embodiment of the present disclosure is used to ensure that the reception terminal may perform correct reception when data of a logical channel is transmitted simultaneously over multiple carriers via the sidelink interface.

On the basis of the above embodiment, the network-side device may further determine whether to enable the bearer-splitting transmission mode for the radio bearer. Communication efficiency may be further improved in this way.

In the embodiment of the present disclosure, a carrier aggregation scheme for the sidelink interface by using different radio access technologies is proposed. The scheme may ensure that the reception terminal may perform correct reception when data of a logical channel is transmitted simultaneously over multiple carriers via the sidelink interface. In the following embodiments, a terminal at a transmitting side is referred to as a transmission terminal and a terminal at a receiving side is referred to as a reception terminal.

Figure 4:
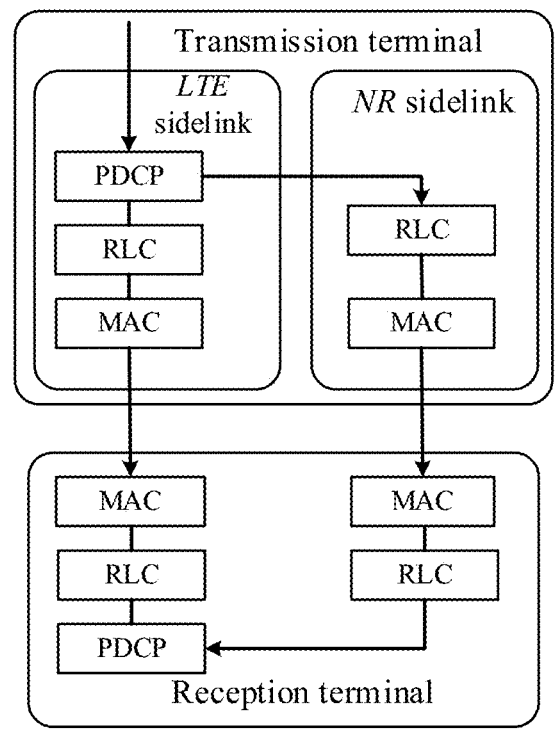
FIG. 4 is a schematic diagram of a network architecture of bearer-splitting for a sidelink interface provided in an embodiment of the present disclosure.

The key thought of the embodiment of the present disclosure refers to that the transmission terminal determines, for a sidelink interface, whether to enable a bearer-splitting transmission mode for a radio bearer. When it is determined to enable bearer-splitting for a bearer, then a PDCP entity corresponding to the bearer needs to be associated with N (N is an integer and N≥2) different RLC entities, and the multiple different RLC entities need to correspond to different MAC entities. A network architecture of bearer-splitting for a sidelink interface provided in an embodiment of the present disclosure is shown in FIG. 4. It is also necessary to ensure that the transmission terminal and reception terminal have a consistent understanding of the relationship between the PDCP entity and the RLC entity corresponding to the bearer for which bearer-splitting is enabled. For example, the relationship between the PDCP entity and the RLC entity corresponding to the bearer for which bearer-splitting is enabled needs to be informed to the reception terminal.

The specific implementation process is described below with different embodiments.

Figure 5:
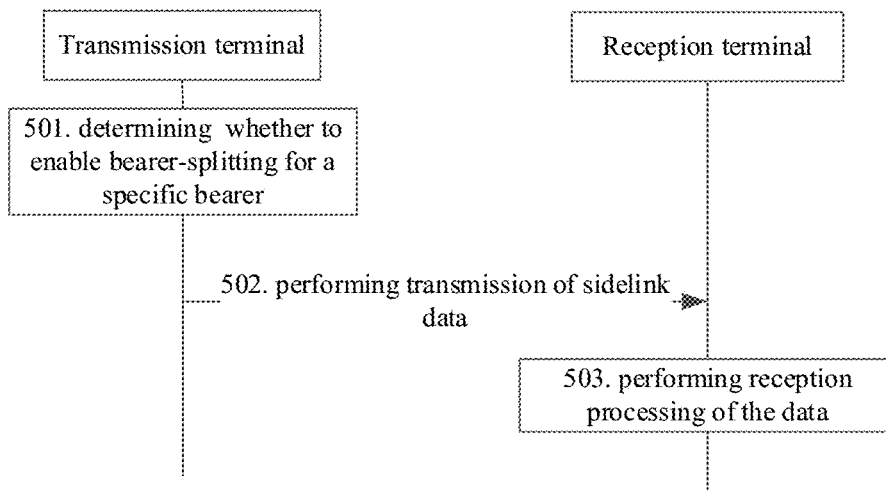
FIG. 5 is a fourth flowchart illustrating an information processing method provided in an embodiment of the present disclosure.

As shown in FIG. 5, an information processing method according to an embodiment of the present disclosure includes Step 501 to Step 503.

Step 501: determining, by a transmission terminal, whether to enable bearer-splitting for a specific bearer.

For a sidelink interface, it is determined whether to enable a bearer-splitting transmission mode for a sidelink bearer (i.e., a radio bearer). A manner to determine whether to enable the bearer-splitting transmission mode for the sidelink bearer includes the following options: a pre-configuration; being determined by the transmission terminal itself; that a network-side device determines whether to enable the bearer-splitting transmission mode and configures it for the transmission terminal.

When it is determined to enable bearer-splitting for a bearer, then a PDCP entity corresponding to the bearer for which bearer-splitting is enabled needs to be associated with N (N is an integer and N≥2) different RLC entities, and it is necessary to ensure that the transmission terminal and the reception terminal have a consistent understanding of the relationship between the PDCP entity and the RLC entities corresponding to the bearer for which bearer-splitting is enabled. In the embodiment, the specific implementation may include: agreeing on an association relationship among logical channel identities of multiple RLC layers corresponding to the bearer for which bearer-splitting is enabled. The specific agreement may include, but is not limited to, one of the following (1)-(3).

(1) an agreement specified in a protocol.

For example, it is explicitly specified in the protocol that once bearer-splitting is enabled for the bearer currently using a LCID number m, corresponding another LCID number used for bearer-split data must be n.

(2) pre-configuring for the terminal.

For example, it is explicitly specified in pre-configuration information of the terminal that once bearer-splitting is enabled for the bearer currently using the LCID number m, corresponding another LCID number used for bearer-split data must be n.

(3) an agreement agreed on by the transmission terminal and the reception terminal themselves, for example, the transmission terminal or the reception terminal informs the other terminal of the association relationship.

For example, the transmission terminal determines that once bearer-splitting is enabled for the bearer currently using the LCID number m, its corresponding another LCID number used for bearer-split data must be n. The transmission terminal informs the reception terminal of the association relationship.

Step 502: performing, by the transmission terminal, transmission of sidelink data.

Step 503: performing, by the reception terminal, reception of the data.

An RLC/PDCP entity establishment process of the reception terminal includes: receiving, by the reception terminal, a packet, and determining whether an RLC entity corresponding to the packet has been established; establishing the corresponding RLC entity if the RLC entity corresponding to the packet is not established; determining, by the reception terminal, an LCID carried in the packet, and determining whether data, corresponding to other LCIDs that have a bearer-splitting association relationship with the LCID, already has a corresponding PDCP entity. If there is a corresponding PDCP entity, an RLC entity corresponding to the data is associated with the PDCP entity; if there is no corresponding PDCP entity, a new PDCP entity is established.

Once the PDCP/RLC entity of the relevant reception terminal is established, the reception terminal may simply follow a normal data processing flow for receiving data.

Figure 6:
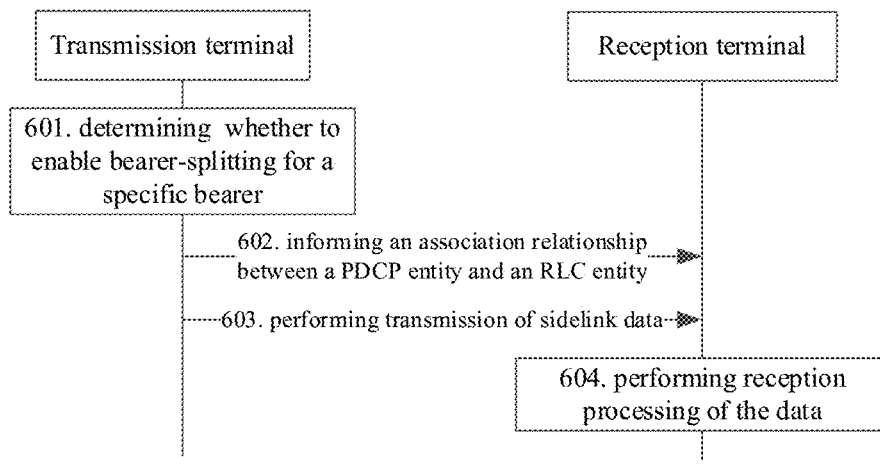
FIG. 6 is a fifth flowchart illustrating an information processing method provided in an embodiment of the present disclosure.

As shown in FIG. 6, an information processing method according to an embodiment of the present disclosure includes Step 601 to Step 604.

Step 601: determining, by a transmission terminal, whether to enable bearer-splitting for a specific bearer.

For a sidelink interface, it is determined whether to enable a bearer-splitting transmission mode for a sidelink bearer (i.e., a radio bearer). A manner for determining whether to enable the bearer-splitting transmission mode for the sidelink bearer includes the following options: pre-configuration; being determined by the transmission terminal itself; that a network-side device determines whether to enable the bearer-splitting transmission mode and configures it to the transmission terminal.

When it is determined to enable bearer-splitting for a bearer, then a PDCP entity corresponding to the bearer for which bearer-splitting is enabled needs to be associated with N (N is an integer and N≥2) different RLC entities.

Step 602: informing, by the transmission terminal, the reception terminal of an association relationship between a PDCP entity and an RLC entity corresponding to the bearer for which bearer-splitting is enabled.

The transmission terminal needs to inform the reception terminal of the relationship between the PDCP entity and the RLC entity corresponding to the bearer for which bearer-splitting is enabled, and a specific implementation may include: configuring, by using a control-plane signaling over a sidelink interface, an association relationship among logical channel identities of multiple RLC layers corresponding to the bearer for which bearer-splitting is enabled. The specific control-plane signaling may be, but is not limited to the following (1)-(3).

(1) A RRC signaling over the sidelink interface.

For example, a RRC reconfiguration signaling is used to inform the reception terminal of that bearer-splitting is enabled for the bearer currently using the LCID number m, and its corresponding another LCID number used for bearer-split data must be n.

(2) A MAC signaling over the sidelink interface.

Figure 7:
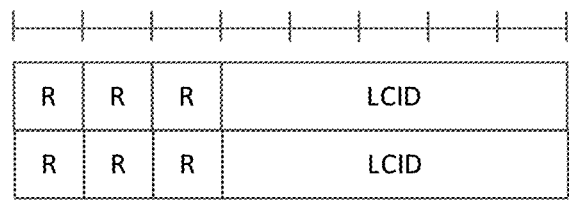
FIG. 7 is a schematic diagram illustrating a format of a MAC CE provided in an embodiment of the present disclosure.

For example, a specific MAC signaling needs to include multiple LCIDs of the bearer for which bearer-splitting is enabled. For example, if the bearer for which bearer-splitting is enabled uses at most RLC entities for transmission, then an MAC CE (Control Element (CE)) format is shown in FIG. 7 as an example below. R represents a reserved field.

(3) A physical layer signaling over the sidelink interface.

For example, LCID indication information is added to the physical layer signaling to indicate the association relationship between multiple LCIDs of the bearer for which bearer-splitting is enabled.

Step 603: performing, by the transmission terminal, transmission of sidelink data.

Step 604: performing, by the reception terminal, reception processing of the data.

An RLC/PDCP entity establishment process of the reception terminal includes: receiving, by the reception terminal, a packet, and determining whether an RLC entity corresponding to the packet has been established; establishing the corresponding RLC entity if the RLC entity corresponding to the packet is not established; determining, by the reception terminal, an LCID carried in the packet, and determining whether data, corresponding to other LCIDs that have a bearer-splitting association relationship with the LCID, already has a corresponding PDCP entity. If there is a corresponding PDCP entity, an RLC entity corresponding to the data is associated with the PDCP entity; if there is no corresponding PDCP entity, a new PDCP entity is established.

Once the PDCP/RLC entity of the relevant reception terminal is established, the reception terminal may simply follow a normal data processing flow for receiving data.

Figure 8:
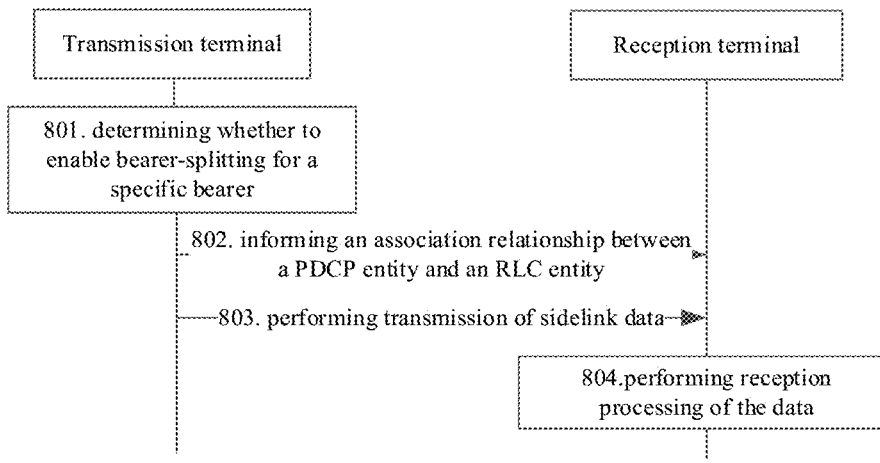
FIG. 8 is a sixth flowchart illustrating an information processing method provided in an embodiment of the present disclosure.

As shown in FIG. 8, an information processing method according to an embodiment of the present disclosure includes Step 801 to Step 804.

Step 801: determining, by a transmission terminal, whether to enable bearer-splitting for a specific bearer.

For a sidelink interface, it is determined whether to enable a bearer-splitting transmission mode for a sidelink bearer (i.e., a radio bearer). A manner for determining whether to enable the bearer-splitting transmission mode for the sidelink bearer includes the following options: pre-configuration; being determined by the transmission terminal itself; that a network-side device determines whether to enable the bearer-splitting transmission mode and configures it to the transmission terminal.

When the transmission terminal determines to enable bearer-splitting for a bearer, then a PDCP entity corresponding to the bearer for which bearer-splitting is enabled needs to be associated with N (N is an integer and N≥2) different RLC entities.

Step 802: informing, by the transmission terminal, the reception terminal of an association relationship between a PDCP entity and an RLC entity corresponding to the bearer for which bearer-splitting is enabled.

The transmission terminal needs to inform the reception terminal of the relationship between the PDCP entity and the RLC entity corresponding to the bearer for which bearer-splitting is enabled, and a specific implementation may include: carrying an identity of a PDCP entity, corresponding to packet to be transmitted, of the transmission terminal by using user-plane data over the sidelink interface. Specifically, the identity of the PDCP entity may be carried in any of the following portions: a header or data portion of a PDCP PDU; a header or data portion of an RLC PDU.

Figure 9:
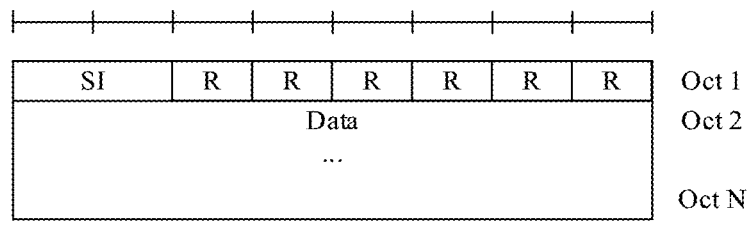
FIG. 9 is a schematic diagram illustrating a method of indicating a PDCP entity number provided in an embodiment of the present disclosure.

For example, taking the RLC unacknowledged mode (UM) PDU as an example, three R bits in FIG. 9 are used to indicate its corresponding PDCP entity number. The PDCP entity number may be an absolute number or a relative number. Taking the relative number as an example, such as a PDCP entity number of the first bearer for which bearer-splitting is enabled may be 000, a PDCP entity number of the second bearer for which bearer-splitting is enabled may be 001, and so on. R represents a reserved field, SI represents segmentation indication (Segmentation Info), Data represents data.

Step 803: performing, by the transmission terminal, transmission of sidelink data.

Step 804: performing, by the reception terminal, reception processing of the data.

An RLC/PDCP entity establishment process of the reception terminal includes: receiving, by the reception terminal, a packet, and determining whether an RLC entity corresponding to the packet has been established; establishing the corresponding RLC entity if the RLC entity corresponding to the packet is not established; determining, by the reception terminal, an LCID carried in the packet, and determining whether data, corresponding to other LCIDs that have a bearer-splitting association relationship with the LCID, already has a corresponding PDCP entity. If there is a corresponding PDCP entity, an RLC entity corresponding to the data is associated with the PDCP entity; if there is no corresponding PDCP entity, a new PDCP entity is established.

Once the PDCP/RLC entity of the relevant reception terminal is established, the reception terminal may simply follow a normal data processing flow for receiving data.

Figure 10:
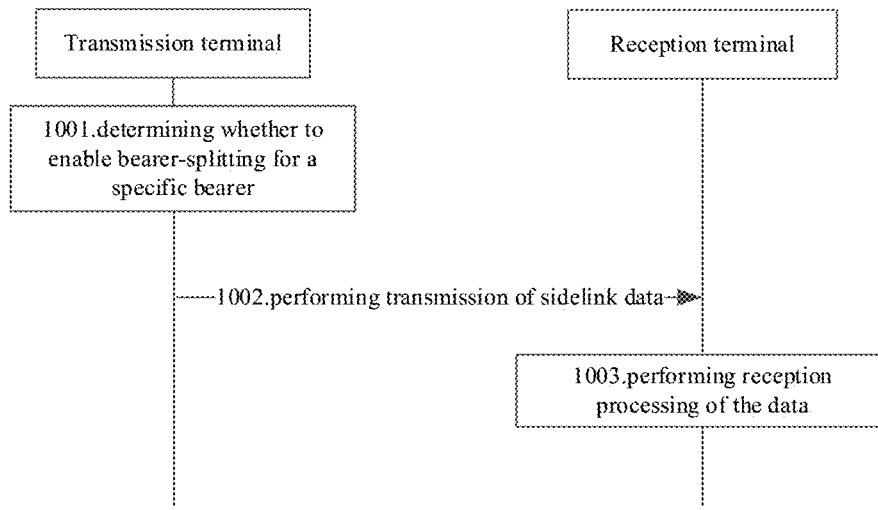
FIG. 10 is a seventh flowchart illustrating an information processing method provided in an embodiment of the present disclosure.

As shown in FIG. 10, an information processing method according to an embodiment of the present disclosure includes Steps 1001-1003.

Step 1001: determining, by a transmission terminal, whether to enable bearer-splitting for a specific bearer.

For a sidelink interface, it is determined whether to enable a bearer-splitting transmission mode for a sidelink bearer (i.e., a radio bearer). A manner to determine whether to enable the bearer-splitting transmission mode for the sidelink bearer include the following options: pre-configuration; being determined by the transmission terminal itself; that a network-side device determines whether to enable the bearer-splitting transmission mode and configures it to the transmission terminal.

When it is determined to enable bearer-splitting for a bearer, then a PDCP entity corresponding to the bearer for which bearer-splitting is enabled needs to be associated with N (N is an integer and N≥2) different RLC entities, and it is necessary to ensure that the transmission terminal and the reception terminal have a consistent understanding of the relationship between the PDCP entity and the RLC entity corresponding to the bearer for which bearer-splitting is enabled.

A specific implementation may include: configuring, by the network-side device, the association relationship for the transmission terminal and the reception terminal respectively, where the configuration signaling from the network side includes, but is not limited to: (1) broadcast and (2) a dedicated signaling.

For example, a system information block (System Information Block (SIB)) transmitted by the network-side device is used to broadcast that once bearer-splitting is enabled for the bearer currently using the LCID number m, its corresponding another LCID number used for bearer-split data must be n.

Step 1002: performing, by the transmission terminal, transmission of sidelink data.

Step 1003: performing, by the reception terminal, reception processing of the data.

An RLC/PDCP entity establishment process of the reception terminal includes: receiving, by the reception terminal, a packet, and determining whether an RLC entity corresponding to the packet has been established; establishing the corresponding RLC entity if the RLC entity corresponding to the packet is not established; determining, by the reception terminal, an LCID carried in the packet, and determining whether data, corresponding to other LCIDs that have a bearer-splitting association relationship with the LCID, already has a corresponding PDCP entity. If there is a corresponding PDCP entity, an RLC entity corresponding to the data is associated with the PDCP entity; if there is no corresponding PDCP entity, a new PDCP entity is established.

Once the PDCP/RLC entity of the relevant reception terminal is established, the reception terminal may simply follow a normal data processing flow for receiving data.

Figure 11:
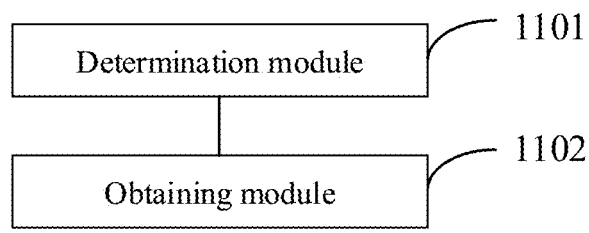
FIG. 11 is a first schematic diagram of an information processing apparatus provided in an embodiment of the present disclosure.

As shown in FIG. 11, an information processing apparatus according to an embodiment of the present disclosure is applied to a transmission terminal and includes: a determination module 1101, configured to determine, for a sidelink interface, whether to enable a bearer-splitting transmission mode for a radio bearer; an obtaining module 1102, configured to obtain an association relationship between a PDCP entity corresponding to the radio bearer and RLC entities corresponding to the radio bearer in a case of determining to enable the bearer-splitting transmission mode for the radio bearer.

A quantity of the RLC entities corresponding to the PDCP entity is N, N is an integer and N≥2.

The determination module is specifically configured to determine whether to enable the bearer-splitting transmission mode for the radio bearer by using any of following: pre-configuration; being determined by itself; that it is determined, based on a configuration obtained from a network-side device, that the network-side device determines whether to enable the bearer-splitting transmission mode for the radio bearer.

Different RLC entities correspond to different MAC entities.

Optionally, the obtaining module 1102 is specifically configured to obtain a predetermined association relationship among logical channel identities of multiple RLC layers corresponding to the radio bearer.

A predetermined mode includes any one of following: predetermination in a protocol; predetermination in pre-configuration information of the transmission terminal and the reception terminal.

Optionally, the obtaining module 1102 includes: a reception submodule, configured to receive configuration signaling transmitted by a network-side device; an obtaining submodule configured to obtain, based on the configuration signaling, an association relationship among logical channel identities of multiple RLC layers corresponding to the radio bearer.

Optionally, the obtaining module 1102 is specifically configured to determine itself an association relationship among logical channel identities of multiple RLC layers corresponding to the radio bearer.

Optionally, the apparatus further includes an indication module 1130 configured to indicate, to a reception terminal, the association relationship via the sidelink interface.

Optionally, the indication module 1130 is specifically configured to indicate, based on a control-plane signaling over the sidelink interface, to the reception terminal the association relationship among logical channel identities of multiple RLC layers corresponding to the radio bearer. The control-plane signaling over the sidelink interface includes any one of following: a RRC signaling over the sidelink interface; a MAC signaling over the sidelink interface; a physical layer signaling over the sidelink interface. The control-plane signaling over the sidelink interface includes at least one of following: an identity of the PDCP entity; identity information of logical channels of multiple RLC layers associated with the same PDCP entity.

Optionally, the indication module 1103 is specifically configured to carry an identity of a PDCP entity, corresponding to data to be transmitted, of the transmission terminal by using user-plane data over the sidelink interface. The identity of the PDCP entity is carried in a header or data portion of a PDCP protocol data unit (PDU); or, the identity of the PDCP entity is carried in a header or data portion of an RLC PDU.

The operation principle of the apparatus according to the embodiment of the present disclosure may be referred to the description of the previous method embodiment.

In the embodiment of the present disclosure, the association relationship between the PDCP entity corresponding to the radio bearer and RLC entities corresponding to the radio bearer is obtained in a case of determining to enable the bearer-splitting transmission mode for the radio bearer, so that the embodiment of the present disclosure may ensure that the reception terminal may perform correct reception when data of a logical channel is transmitted simultaneously over multiple carriers via the sidelink interface.

Figure 12:
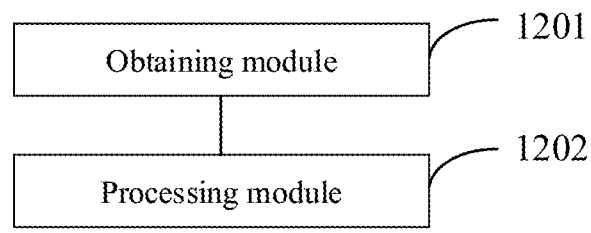
FIG. 12 is a second schematic diagram of an information processing apparatus provided in an embodiment of the present disclosure.

As shown in FIG. 12, an information processing apparatus according to an embodiment of the present disclosure is applied to a reception terminal and includes: an obtaining module 1201, configured to obtain an association relationship between a Packet Data Convergence Protocol (PDCP) entity corresponding to a radio bearer and RLC entities corresponding to the radio bearer; a processing module 1202, configured to process a received packet according to the association relationship.

The radio bearer is a bearer for which a sidelink interface enables a bearer-splitting transmission mode; a quantity of the RLC entities corresponding to the PDCP entity is N, N is an integer and N≥2.

Optionally, the obtaining module 1201 is specifically configured to obtain a predetermined association relationship among logical channel identities of multiple RLC layers corresponding to the radio bearer. A mode of the predetermination includes any one of following: predetermination in a protocol; predetermination in pre-configuration information of the transmission terminal and the reception terminal.

Optionally, the obtaining module 1201 includes: a first reception submodule, configured to receive a configuration signaling transmitted by a network-side device; a first obtaining submodule configured to obtain, based on the configuration signaling, an association relationship among logical channel identities of multiple RLC layers corresponding to the radio bearer.

Optionally, the obtaining module 1201 includes: a second reception submodule, configured to receive a control-plane signaling over the sidelink interface transmitted by a transmission terminal; a second obtaining submodule configured to obtain, based on the control-plane signaling over the sidelink interface, an association relationship among logical channel identities of multiple RLC layers corresponding to the radio bearer.

The control-plane signaling over the sidelink interface includes any one of following: a RRC signaling over the sidelink interface; a MAC signaling over the sidelink interface; a physical layer signaling over the sidelink interface. The control-plane signaling over the sidelink interface includes at least one of following: an identity of the PDCP entity; identity information of logical channels of multiple RLC layers associated with the same PDCP entity.

Optionally, the obtaining module 1201 includes: a third reception submodule, configured to receive user-plane data over the sidelink interface transmitted by a transmission terminal, where the user-plane data over the sidelink interface carries an identity of a PDCP entity, corresponding to data to be transmitted, of the transmission terminal; a third obtaining submodule configured to obtain, based on the identity of the PDCP entity, the association relationship between the PDCP entity corresponding to the radio bearer and the RLC entities corresponding to the radio bearer. The identity of the PDCP entity is carried in a header or data portion of a PDCP protocol data unit (PDU); or, the identity of the PDCP entity is carried in a header or data portion of an RLC PDU.

The operation principle of the apparatus according to the embodiment of the present disclosure may be referred to the description of the previous method embodiment.

In the embodiment of the present disclosure, the association relationship between the PDCP entity corresponding to the radio bearer and RLC entities corresponding to the radio bearer is obtained in a case of determining to enable the bearer-splitting transmission mode for the radio bearer, so that the embodiment of the present disclosure may ensure that the reception terminal may perform correct reception when data of a logical channel is transmitted simultaneously over multiple carriers via the sidelink interface.

Figure 13:
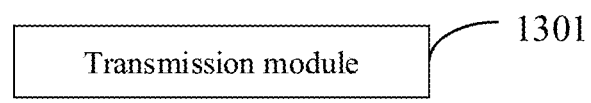
FIG. 13 is a third schematic diagram of an information processing apparatus provided in an embodiment of the present disclosure.

As shown in FIG. 13, an information processing apparatus according to an embodiment of the present disclosure is applied to a network-side device and includes: a transmission module 1301, configured to transmit a configuration signaling to a terminal, where the configuration signaling includes an association relationship between a PDCP entity corresponding to a radio bearer and RLC entities corresponding to the radio bearer; where the radio bearer is a bearer for which a sidelink interface enables a bearer-splitting transmission mode; a quantity of RLC entities corresponding to the PDCP entity is N, N is an integer and N≥2.

Optionally, the apparatus further includes: a determination module 1302, configured to determine whether to enable the bearer-splitting transmission mode for the radio bearer.

The terminal includes a transmission terminal and a reception terminal. Optionally, the transmission module 1301 is specifically configured to configure an association relationship among logical channel identities of multiple RLC layers corresponding to the radio bearer to the transmission terminal and/or the reception terminal via broadcast or dedicated signaling.

The operation principle of the apparatus according to the embodiment of the present disclosure may be referred to the description of the previous method embodiment.

In the embodiment of the present disclosure, the association relationship between the PDCP entity corresponding to the radio bearer and RLC entities corresponding to the radio bearer is obtained in a case of determining to enable the bearer-splitting transmission mode for the radio bearer, so that the embodiment of the present disclosure may ensure that the reception terminal may perform correct reception when data of a logical channel is transmitted simultaneously over multiple carriers via the sidelink interface.

Figure 14:
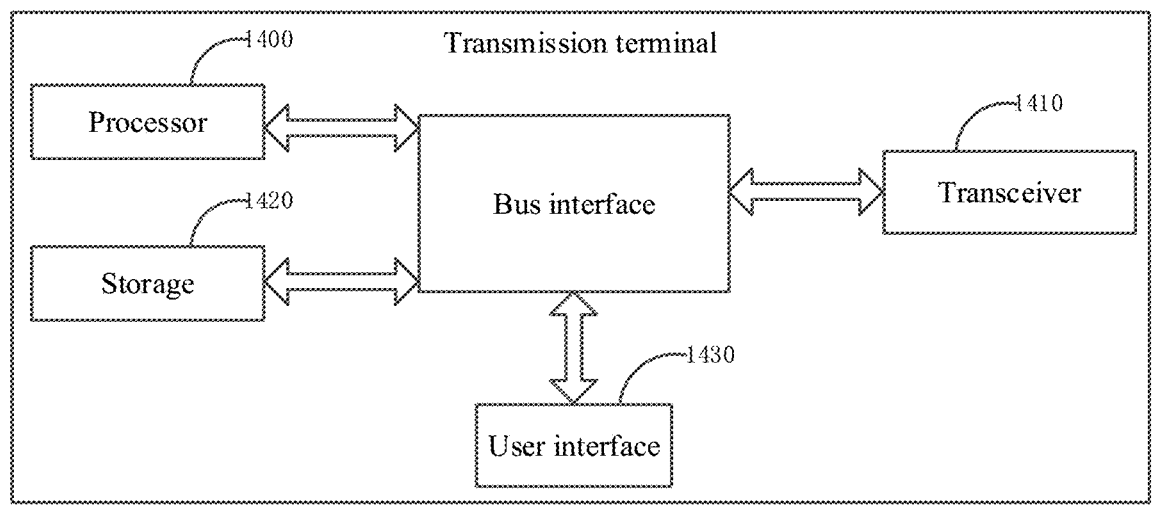
FIG. 14 is a schematic diagram of a transmission terminal provided in an embodiment of the present disclosure.

As shown in FIG. 14, a transmission terminal according to an embodiment of the present disclosure includes a processor 1400 configured to read a program in a storage 1420 and perform the following steps: determining, for a sidelink interface, whether to enable a bearer-splitting transmission mode for a radio bearer; obtaining an association relationship between a PDCP entity corresponding to the radio bearer and RLC entities corresponding to the radio bearer in a case of determining to enable the bearer-splitting transmission mode for the radio bearer; where a quantity of RLC entities corresponding to the PDCP entity is N, N is an integer and N≥2.

The transceiver 1410 is used to receive and send data under control of the processor 1400.

In FIG. 14, a bus architecture may include any number of interconnected buses and bridges. Various circuits, specifically, one or more processors represented by the processor 1400 and a storage represented by the storage 1420, are linked together. The bus architecture may also link various other circuits such as peripherals, voltage regulators and power management circuits, which are well known in the art, and therefore a further description thereof is omitted herein. The bus interface provides interfaces. The transceiver 1410 may be a plurality of elements, that is, includes a transmitter and a receiver, to provide units configured to communicate with various other devices over a transmission medium. For different user devices, a user interface 1430 can also be an interface capable of externally/internally connecting the required devices which including but not limited to a keypad, a display, a speaker, a microphone, a joystick, and the like.

The processor 1400 is responsible for managing the bus architecture and general processing, and the storage 1420 can store data used by the processor 1400 when performing operations.

The processor 1400 is further configured to read the computer program and perform the following steps: determining to enable the bearer-splitting transmission mode for the radio bearer by using any of following: pre-configuration; being determined by itself; that it is determined, based on a configuration obtained from a network-side device, that the network-side device determines whether to enable the bearer-splitting transmission mode for the radio bearer.

Different RLC entities correspond to different MAC entities.

The processor 1400 is further configured to read the computer program and perform the following step: obtaining a predetermined association relationship among logical channel identities of multiple RLC layers corresponding to the radio bearer.

A mode of the predetermination includes any one of following: predetermination in a protocol; predetermination in pre-configuration information of the transmission terminal and the reception terminal.

The processor 1400 is further configured to read the computer program and perform the following steps: receiving a configuration signaling transmitted by a network-side device; obtaining, based on the configuration signaling, an association relationship among logical channel identities of multiple RLC layers corresponding to the radio bearer.

The processor 1400 is further configured to read the computer program and perform the following step: determining itself an association relationship among logical channel identities of multiple RLC layers corresponding to the radio bearer.

The processor 1400 is further configured to read the computer program and perform the following step: indicating to a reception terminal the association relationship via the sidelink interface.

The processor 1400 is further configured to read the computer program and perform the following step: indicating, based on control-plane signaling over the sidelink interface, to the reception terminal the association relationship among logical channel identities of multiple RLC layers corresponding to the radio bearer.

The control-plane signaling over the sidelink interface includes any one of following: a radio resource control (RRC) signaling over the sidelink interface; a Medium Access Control (MAC) signaling over the sidelink interface; a physical layer signaling over the sidelink interface.

The control-plane signaling over the sidelink interface includes at least one of following: an identity of the PDCP entity; identity information of logical channels of multiple RLC layers associated with the same PDCP entity.

The processor 1400 is further configured to read the computer program and perform the following step: carrying an identity of a PDCP entity, corresponding to data to be transmitted, of the transmission terminal by using user-plane data over the sidelink interface.

The identity of the PDCP entity is carried in a header or data portion of a PDCP protocol data unit (PDU); or, the identity of the PDCP entity is carried in a header or data portion of an RLC PDU.

Figure 15:
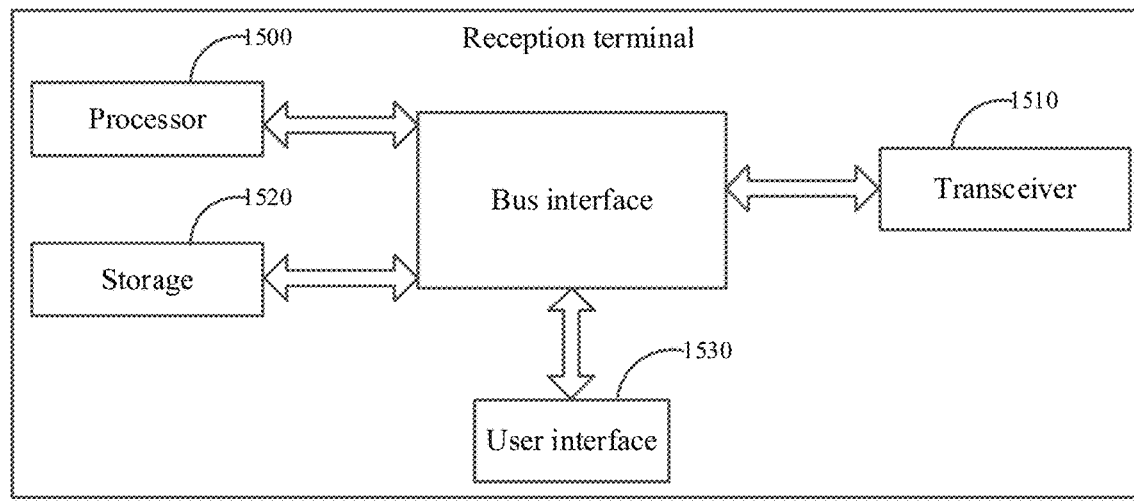
FIG. 15 is a schematic diagram of a reception terminal provided in an embodiment of the present disclosure.

As shown in FIG. 15, a reception terminal according to an embodiment of the present disclosure includes a processor 1500 configured to read the program in the storage 1520 and perform the following steps: obtaining an association relationship between a PDCP entity corresponding to a radio bearer and RLC entities corresponding to the radio bearer; processing a received packet according to the association relationship; where the radio bearer is a bearer for which a sidelink interface enables a bearer-splitting transmission mode; a quantity of the RLC entities corresponding to the PDCP entity is N, N is an integer and N≥2.

The transceiver 1510 is used to receive and send data under control of the processor 1500.

In FIG. 15, a bus architecture may include any number of interconnected buses and bridges. Various circuits, specifically, one or more processors represented by the processor 1500 and a storage represented by the storage 1520, are linked together. The bus architecture may also link various other circuits such as peripherals, voltage regulators and power management circuits, which are well known in the art, and therefore a further description thereof is omitted herein. The bus interface provides interfaces. The transceiver 1510 may be a plurality of elements, that is, includes a transmitter and a receiver, to provide units configured to communicate with various other devices over a transmission medium. For different user devices, the user interface 1530 can also be an interface capable of externally/internally connecting the required devices which including but not limited to a keypad, a display, a speaker, a microphone, a joystick, and the like.

The processor 1500 is responsible for managing the bus architecture and general processing, and the storage 1520 can store data used by the processor 1500 when performing operations.

The processor 1500 is further configured to read the computer program and perform the following step: obtaining a predetermined association relationship among logical channel identities of multiple RLC layers corresponding to the radio bearer.

A mode of the predetermination includes any one of following: predetermination in a protocol; predetermination in pre-configuration information of the transmission terminal and a reception terminal.

The processor 1500 is further configured to read the computer program and perform the following steps: receiving a configuration signaling transmitted by a network-side device; obtaining, based on the configuration signaling, an association relationship among logical channel identities of multiple RLC layers corresponding to the radio bearer.

The processor 1500 is further configured to read the computer program and perform the following steps: receiving a control-plane signaling over the sidelink interface transmitted by a transmission terminal; obtaining, based on the control-plane signaling over the sidelink interface, an association relationship among logical channel identities of multiple RLC layers corresponding to the radio bearer.

The control-plane signaling over the sidelink interface includes any one of following: a radio resource control (RRC) signaling over the sidelink interface; a Medium Access Control (MAC) signaling over the sidelink interface; a physical layer signaling over the sidelink interface.

The control-plane signaling over the sidelink interface includes at least one of following: an identity of the PDCP entity; identity information of logical channels of multiple RLC layers associated with the same PDCP entity.

The processor 1500 is further configured to read the computer program and perform the following steps: receiving user-plane data over the sidelink interface transmitted by a transmission terminal, where the user-plane data over the sidelink interface carries an identity of a PDCP entity, corresponding to data to be transmitted, of the transmission terminal; obtaining, based on the identity of the PDCP entity, the association relationship between the PDCP entity corresponding to the radio bearer and the RLC entities corresponding to the radio bearer.

The identity of the PDCP entity is carried in a header or data portion of a PDCP protocol data unit (PDU); or, the identity of the PDCP entity is carried in a header or data portion of an RLC PDU.

The processor 1500 is further configured to read the computer program and perform the following steps: determining whether there is a RLC entity corresponding to the received packet; establishing the corresponding RLC entity in a case that it is determined that there is no corresponding RLC entity; determining whether there is a PDCP entity corresponding to a target packet according to the association relationship and a logical channel identity of the received packet; establishing the corresponding PDCP entity in a case that it is determined that there is no corresponding PDCP entity; associating the RLC entity corresponding to the received packet with the PDCP entity in a case that the corresponding PDCP entity is determined to be available.

There is a bearer-splitting association relationship between a logical channel identity of the target packet and the logical channel identity of the received packet.

Figure 16:
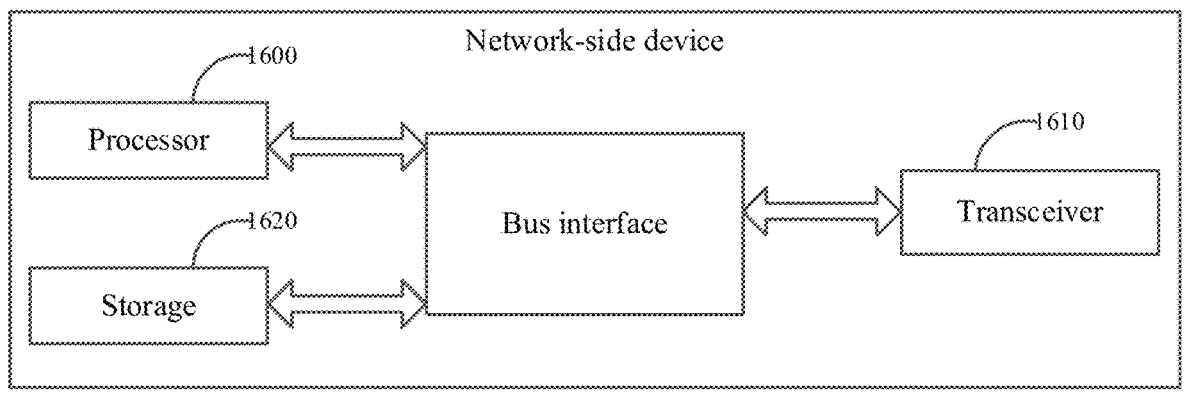
FIG. 16 is a schematic diagram of a network-side device provided in an embodiment of the present disclosure.

As shown in FIG. 16, a network-side device according to an embodiment of the present disclosure includes: a processor 1600; a transceiver 1610, configured to transmit a configuration signaling to a terminal, where the configuration signaling includes an association relationship between a PDCP entity corresponding to a radio bearer and RLC entities corresponding to the radio bearer; where the radio bearer is a bearer for which a sidelink interface enables a bearer-splitting transmission mode; a quantity of the RLC entities corresponding to the PDCP entity is N, N is an integer and N≥2.

In FIG. 16, a bus architecture may include any number of interconnected buses and bridges. Various circuits, specifically, one or more processors represented by the processor 1600 and a storage represented by the storage 1620, are linked together. The bus architecture may also link various other circuits such as peripherals, voltage regulators and power management circuits, which are well known in the art, and therefore a further description thereof is omitted herein. The bus interface provides interfaces. The transceiver 1610 may be a plurality of elements, that is, includes a transmitter and a transceiver, to provide units configured to communicate with various other apparatuses over a transmission medium. The processor 1600 is responsible for managing the bus architecture and general processing, and the storage 1620 may store data used by the processor 1600 when performing operations.

The processor 1600 is responsible for managing the bus architecture and general processing, and the storage 1620 may store data used by the processor 1600 when performing operations.

The processor 1600 is further configured to read the computer program and perform the following steps: determining whether to enable the bearer-splitting transmission mode for the radio bearer.

The terminal includes a transmission terminal and a reception terminal.

The transceiver is 1610 further configured to configure an association relationship among logical channel identities of multiple RLC layers corresponding to the radio bearer to the transmission terminal and/or the reception terminal via broadcast or dedicated signaling.

In addition, the computer readable storage medium according to an embodiment of the present disclosure is used to store a computer program, the computer program is performed by a processor to implement the following steps: determining, for a sidelink interface, whether to enable a bearer-splitting transmission mode for a radio bearer; obtaining an association relationship between a PDCP entity corresponding to the radio bearer and RLC entities corresponding to the radio bearer in a case of determining to enable the bearer-splitting transmission mode for the radio bearer; where a quantity of the RLC entities corresponding to the PDCP entity is N, N is an integer and N≥2.

Whether to enable the bearer-splitting transmission mode for the radio bearer is determined by using any of following: pre-configuration; being determined by the transmission terminal itself; that the transmission terminal determines, based on a configuration obtained from a network-side device, that the network-side device determines whether to enable the bearer-splitting transmission mode for the radio bearer.

Different RLC entities correspond to different MAC entities.

Obtaining the association relationship between the PDCP entity corresponding to the radio bearer and the RLC entities corresponding to the radio bearer includes: obtaining a predetermined association relationship among logical channel identities of multiple RLC layers corresponding to the radio bearer.

A mode of the predetermination includes any one of following: predetermination in a protocol; predetermination in pre-configuration information of the transmission terminal and a reception terminal.

Obtaining the association relationship between the PDCP entity corresponding to the radio bearer and the RLC entities corresponding to the radio bearer includes: receiving a configuration signaling transmitted by a network-side device; obtaining, based on the configuration signaling, an association relationship among logical channel identities of multiple RLC layers corresponding to the radio bearer.

Obtaining the association relationship between the PDCP entity corresponding to the radio bearer and the RLC entities corresponding to the radio bearer includes: determining, by the transmission terminal itself, an association relationship among logical channel identities of multiple RLC layers corresponding to the radio bearer.

The method further includes: indicating, to a reception terminal, the association relationship via the sidelink interface.

Indicating, to the reception terminal, the association relationship via the sidelink interface includes: indicating, based on a control-plane signaling over the sidelink interface, to the reception terminal the association relationship among logical channel identities of multiple RLC layers corresponding to the radio bearer.

The control-plane signaling over the sidelink interface includes any one of following: a radio resource control (RRC) signaling over the sidelink interface; a medium access control (MAC) signaling over the sidelink interface; a physical layer signaling over the sidelink interface.

The control-plane signaling over the sidelink interface includes at least one of following: an identity of the PDCP entity; identity information of logical channels of multiple RLC layers associated with the same PDCP entity.

Indicating to the reception terminal the association relationship via the sidelink interface includes: carrying, an identity of a PDCP entity, corresponding to data to be transmitted, of the transmission terminal by using user-plane data over the sidelink interface.

The identity of the PDCP entity is carried in a header or data portion of a PDCP protocol data unit (PDU); or, the identity of the PDCP entity is carried in a header or data portion of an RLC PDU.

In addition, the computer readable storage medium according to an embodiment of the present disclosure is used to store a computer program, the computer program is performed by a processor to implement the following steps: obtaining an association relationship between a PDCP entity corresponding to a radio bearer and RLC entities corresponding to the radio bearer; processing a received packet according to the association relationship.

The radio bearer is a bearer for which a sidelink interface enables a bearer-splitting transmission mode; a quantity of the RLC entities corresponding to the PDCP entity is N, N is an integer and N≥2.

Obtaining the association relationship between the PDCP entity corresponding to the radio bearer and the RLC entities corresponding to the radio bearer includes: obtaining a predetermined association relationship among logical channel identities of multiple RLC layers corresponding to the radio bearer.

A mode of the predetermination includes any one of following: predetermination in a protocol; predetermination in pre-configuration information of the transmission terminal and the reception terminal.

Obtaining the association relationship between the PDCP entity corresponding to the radio bearer and the RLC entities corresponding to the radio bearer includes: receiving a configuration signaling transmitted by a network-side device; obtaining, based on the configuration signaling, an association relationship among logical channel identities of multiple RLC layers corresponding to the radio bearer.

Obtaining the association relationship between the PDCP entity corresponding to the radio bearer and the RLC entities corresponding to the radio bearer includes: receiving a control-plane signaling over the sidelink interface transmitted by a transmission terminal; obtaining, based on the control-plane signaling over the sidelink interface, an association relationship among logical channel identities of multiple RLC layers corresponding to the radio bearer.

The control-plane signaling over the sidelink interface includes any one of following: a Radio Resource Control (RRC) signaling over the sidelink interface; a Medium Access Control (MAC) signaling over the sidelink interface; a physical layer signaling over the sidelink interface.

The control-plane signaling over the sidelink interface includes at least one of following: an identity of the PDCP entity; identity information of logical channels of multiple RLC layers associated to the same PDCP entity.

Obtaining the association relationship between the PDCP entity corresponding to the radio bearer and the RLC entities corresponding to the radio bearer includes: receiving user-plane data over the sidelink interface transmitted by a transmission terminal, where the user-plane data over the sidelink interface carries an identity of a PDCP entity, corresponding to data to be transmitted, of the transmission terminal; obtaining, based on the identity of the PDCP entity, the association relationship between the PDCP entity corresponding to the radio bearer and the RLC entities corresponding to the radio bearer.

The identity of the PDCP entity is carried in a header or data portion of a PDCP protocol data unit (PDU); or, the identity of the PDCP entity is carried in a header or data portion of an RLC PDU.

Processing the received packet according to the association relationship includes: determining whether there is a RLC entity corresponding to the received packet; establishing the corresponding RLC entity in a case that it is determined that there is no corresponding RLC entity; determining whether there is a PDCP entity corresponding to a target packet according to the association relationship and a logical channel identity of the received packet; establishing the corresponding PDCP entity in a case that it is determined that there is no corresponding PDCP entity; associating the RLC entity corresponding to the received packet with the PDCP entity in a case that the corresponding PDCP entity is determined to be available.

There is a bearer-splitting association relationship between a logical channel identity of the target packet and the logical channel identity of the received packet.

In addition, the computer readable storage medium according to an embodiment of the present disclosure is used to store a computer program, the computer program is performed by a processor to implement the following steps: transmitting a configuration signaling to a terminal, where the configuration signaling includes an association relationship between a packet data convergence protocol (PDCP) entity corresponding to a radio bearer and radio link control (RLC) entities corresponding to the radio bearer.

The radio bearer is a bearer for which a sidelink interface enables a bearer-splitting transmission mode; a quantity of the RLC entities corresponding to the PDCP entity is N, N is an integer and N≥2.

Prior to transmitting the configuration signaling to the terminal, the method further includes: determining whether to enable the bearer-splitting transmission mode for the radio bearer.

The terminal includes a transmission terminal and a reception terminal.

Transmitting the configuration signaling to the terminal includes: configuring an association relationship among logical channel identities of multiple RLC layers corresponding to the radio bearer to the transmission terminal and/or the reception terminal via broadcast or dedicated signaling.

In some embodiments provided in the present disclosure, it should be noted that, the disclosed method and device may be implemented in other means. For example, the device embodiments described above are merely illustrative. For example, a division of units is only a logical function division. In actual implementation, there may be another division manner, for example, a plurality of units or components may be combined or may be integrated into another system, or some features may be ignored or not be executed. In addition, mutual coupling or direct coupling or communication connection shown or discussed may be an indirect coupling or communication connection through some interfaces, devices or units, and may be in an electrical, mechanical or other form.

In addition, each functional unit in various embodiments of the present disclosure may be integrated into one processing unit, or each unit may exist physically separately, or two or more units may be integrated into one unit. The integrated unit may be implemented in a form of hardware, or may also be implemented in a form of hardware plus a software functional module.

The above integrated unit implemented in the form of software functional units may be stored in a computer readable storage medium. The above software functional unit is stored in a storage medium and includes several instructions for causing a computer device (which may be a personal computer, a server, or a network device, etc.) to perform some steps of the transmitting and receiving methods described in various embodiments of the present disclosure. The foregoing storage medium includes various media that may store program codes, such as an USB flash drive, a mobile hard disk, a Read-Only Memory (ROM for short), a Random Access Memory (RAM for short), a magnetic disk, or an optical disk.

It is to be understood that, these embodiments described in the present disclosure can be implemented in hardware, software, firmware, middleware, microcode, or any combination thereof. For hardware implementation, individual modules, units, subunits or submodules, etc. may be implemented in one or more Application Specific Integrated Circuits (ASIC), Digital Signal Processors (DSP), DSP devices (DSPD), Programmable Logic Devices (PLD), Field Programmable Gate Arrays (FPGA), general purpose processors, controllers, microcontrollers, microprocessors, other electronic units configured to perform the function described in the present disclosure or a combination thereof.

For software implementation, the techniques described in an embodiment of the present disclosure can be implemented by modules (e.g., procedures, functions, etc.) that perform the functions described in an embodiment of the present disclosure. The software code can be stored in the storage and executed by the processor. The storage can be implemented within the processor or external to the processor.

The descriptions above are optional embodiments of the disclosure, it should be noted that improvements and embellishments may be made by one skilled in the art within departing from the principle of the present disclosure, and such improvements and embellishments shall be within the protection scope of the present disclosure.

What is claimed is:

1. An information processing method performed by a transmission terminal, comprising:
   determining, for a sidelink interface, whether to enable a bearer-splitting transmission mode for a radio bearer;
   obtaining a relationship between a Packet Data Convergence Protocol (PDCP) entity corresponding to the radio bearer and Radio Link Control (RLC) entities corresponding to the radio bearer in a case of determining to enable the bearer-splitting transmission mode for the radio bearer;
   wherein a quantity of the RLC entities corresponding to the PDCP entity is N, N is an integer and N≥2,
   wherein,
   obtaining the relationship between the Packet Data Convergence Protocol (PDCP) entity corresponding to the radio bearer and the Radio Link Control (RLC) entities corresponding to the radio bearer comprises:
      obtaining a predetermined relationship among logical channel identities of multiple RLC layers corresponding to the radio bearer, wherein, a mode of predetermination comprises any one of following: predetermination in a protocol; predetermination in pre-configuration information of the transmission terminal and a reception terminal;
   or,
   obtaining the relationship between the Packet Data Convergence Protocol (PDCP) entity corresponding to the radio bearer and the Radio Link Control (RLC) entities corresponding to the radio bearer comprises:
      receiving a configuration signaling from a network-side device;
      obtaining, based on the configuration signaling, a relationship among logical channel identities of multiple RLC layers corresponding to the radio bearer;

or,
obtaining the relationship between the packet data convergence protocol (PDCP) entity corresponding to the radio bearer and the radio link control (RLC) entities corresponding to the radio bearer comprises:
determining, by the transmission terminal itself, a relationship among logical channel identities of multiple RLC layers corresponding to the radio bearer.

2. The method according to claim 1, wherein whether to enable the bearer-splitting transmission mode for the radio bearer is determined by using any of following:
pre-configuration;
being determined by the transmission terminal itself;
determination based on configuration from a network.

3. The method according to claim 1, wherein, different RLC entities correspond to different Media Access Control (MAC) entities.

4. The method according to claim 1, wherein, in case of determining, by the transmission terminal itself, a relationship among logical channel identities of multiple RLC layers corresponding to the radio bearer, the method further comprises:
indicating, to a reception terminal, the relationship via the sidelink interface.

5. The method according to claim 4, wherein indicating, to the reception terminal, the relationship via the sidelink interface comprises:
indicating, through a control-plane signaling over the sidelink interface, to the reception terminal the relationship among logical channel identities of multiple RLC layers corresponding to the radio bearer,
the control-plane signaling over the sidelink interface comprises any one of following:
a Radio Resource Control (RRC) signaling over the sidelink interface; a Medium Access Control (MAC) signaling over the sidelink interface; a physical layer signaling over the sidelink interface.

6. The method according to claim 5, wherein, the control-plane signaling over the sidelink interface comprises at least one of following:
an identity of the PDCP entity;
identity information of logical channels of multiple RLC layers associated with the same PDCP entity.

7. The method according to claim 4, wherein indicating, to the reception terminal, the relationship via the sidelink interface comprises:
carrying an identity of a PDCP entity, corresponding to data to be transmitted, of the transmission terminal by using user-plane data over the sidelink interface.

8. The method according to claim 7, wherein,
the identity of the PDCP entity is carried in a header or a data portion of a PDCP Protocol Data Unit (PDU); or
the identity of the PDCP entity is carried in a header or a data portion of an RLC PDU.

9. A transmission terminal, comprising:
a transceiver, a storage, a processor and a program stored in the storage and executable by the processor;
wherein, the processor is configured to read the program in the storage and perform steps of the information processing method according to claim 1.

10. An information processing method performed by a reception terminal, comprising:
obtaining a relationship between a packet Data Convergence Protocol (PDCP) entity corresponding to a radio bearer and a Radio Link Control (RLC) entities corresponding to the radio bearer;
processing a received packet according to the relationship;
wherein the radio bearer is a bearer for which a sidelink interface enables a bearer-splitting transmission mode; a quantity of the RLC entities corresponding to the PDCP entity is N, N is an integer and N≥2,
wherein,
obtaining the relationship between the PDCP entity corresponding to the radio bearer and the RLC entities corresponding to the radio bearer comprises:
obtaining a predetermined relationship among logical channel identities of multiple RLC layers corresponding to the radio bearer, wherein, a mode of the predetermination comprises any one of following: predetermination in a protocol; or predetermination in pre-configuration information of the transmission terminal and a reception terminal;
or,
obtaining the relationship between the PDCP entity corresponding to the radio bearer and the RLC entities corresponding to the radio bearer comprises:
receiving a configuration signaling from a network-side device;
obtaining, based on the configuration signaling, a relationship among logical channel identities of multiple RLC layers corresponding to the radio bearer;
or,
obtaining the relationship between the PDCP entity corresponding to the radio bearer and the RLC entities corresponding to the radio bearer comprises:
receiving a control-plane signaling over the sidelink interface from a transmission terminal;
obtaining, based on the control-plane signaling over the sidelink interface, a relationship among logical channel identities of multiple RLC layers corresponding to the radio bearer;
or,
obtaining the relationship between the PDCP entity corresponding to the radio bearer and the RLC entities corresponding to the radio bearer comprises:
receiving user-plane data over the sidelink interface from a transmission terminal, wherein the user-plane data over the sidelink interface carries an identity of a PDCP entity, corresponding to data to be transmitted, of the transmission terminal;
obtaining, based on the identity of the PDCP entity, the relationship between the PDCP entity corresponding to the radio bearer and the RLC entities corresponding to the radio bearer.

11. The method according to claim 10, wherein, in case of receiving the control-plane signaling over the sidelink interface from the transmission terminal, the control-plane signaling over the sidelink interface comprises at least one of following:
an identity of the PDCP entity;
identity information of logical channels of multiple RLC layers associated with the same PDCP entity;
or,
in case of receiving the user-plane data over the sidelink interface from the transmission terminal, the identity of the PDCP entity is carried in a header or a data portion of a PDCP Protocol Data Unit (PDU), or the identity of the PDCP entity is carried in a header or a data portion of an RLC PDU.

12. The method according to claim 10, wherein, in case of obtaining, based on the control-plane signaling over the sidelink interface, a relationship among logical channel identities of multiple RLC layers corresponding to the radio bearer, the control-plane signaling over the sidelink interface comprises at least one of following:
- an identity of the PDCP entity;
- identity information of logical channels of multiple RLC layers associated with the same PDCP entity.

13. The method according to claim 10, wherein, in case of obtaining, based on the identity of the PDCP entity, the relationship between the PDCP entity corresponding to the radio bearer and the RLC entities corresponding to the radio bearer,
- the identity of the PDCP entity is carried in a header or a data portion of a PDCP Protocol Data Unit (PDU); or,
- the identity of the PDCP entity is carried in a header or a data portion of an RLC PDU.

14. The method according to claim 10, wherein processing the received packet according to the relationship comprises:
- determining whether there is a RLC entity corresponding to the received packet;
- establishing a corresponding RLC entity in a case that it is determined that there is no corresponding RLC entity;
- determining whether there is a PDCP entity corresponding to a target packet according to the relationship and a logical channel identity of the received packet;
- establishing a corresponding PDCP entity in a case that it is determined that there is no corresponding PDCP entity; associating the RLC entity corresponding to the received packet with the PDCP entity in a case that the corresponding PDCP entity is determined to be available;
- wherein, there is a bearer-splitting relationship between a logical channel identity of the target packet and the logical channel identity of the received packet.

15. A reception terminal, comprising:
a transceiver, a storage, a processor and a program stored in the storage and executable by the processor; wherein, the processor is configured to read the program in the storage and perform steps of the information processing method according to claim 10.

* * * * *